(12) United States Patent
Acks et al.

(10) Patent No.: US 11,072,420 B1
(45) Date of Patent: Jul. 27, 2021

(54) NOSE WHEEL STEERING SYSTEMS AND METHODS

(71) Applicant: GOODRICH CORPORATION, Charlotte, NC (US)

(72) Inventors: James Acks, Medina, OH (US); Korey Michael Reber, Strongsville, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/741,489

(22) Filed: Jan. 13, 2020

(51) Int. Cl.
*B64C 25/50* (2006.01)
*F16H 1/36* (2006.01)

(52) U.S. Cl.
CPC .............. *B64C 25/50* (2013.01); *F16H 1/36* (2013.01)

(58) Field of Classification Search
CPC ............ F16H 19/04; F16H 1/36; B64C 25/50
See application file for complete search history.

(56) References Cited

U.S. PATENT DOCUMENTS

| 4,187,933 | A | * | 2/1980 | Calabrese | F16F 7/1022 188/134 |
|---|---|---|---|---|---|
| 5,186,067 | A | * | 2/1993 | Demissy | F16H 25/2409 74/424.6 |
| 7,328,774 | B2 | * | 2/2008 | Molnar | B66B 9/025 187/270 |
| 8,136,755 | B2 | | 3/2012 | Hadley et al. | |
| 8,177,160 | B2 | | 5/2012 | Hadley et al. | |
| 2004/0026158 | A1 | * | 2/2004 | Rieth | B62D 5/003 180/402 |
| 2006/0052201 | A1 | * | 3/2006 | Augustine | B62D 5/008 475/19 |
| 2016/0101847 | A1 | | 4/2016 | Hawksworth | |
| 2020/0399948 | A1 | * | 12/2020 | Hsieh | E05F 15/635 |

FOREIGN PATENT DOCUMENTS

GB      1312245      4/1973

* cited by examiner

*Primary Examiner* — Sherry L Estremsky
(74) *Attorney, Agent, or Firm* — Snell & Wilmer L.L.P.

(57) ABSTRACT

A steering system may include a gear assembly and a collar. The gear assembly may include a planet carrier, a planet gear, an internal ring gear, and a sun gear. The planet gear may be disposed between the internal ring gear and the sun gear. The gear assembly may provide a mechanical advantage to the steering system, which may result in a greater powered steering range, a shorter rack assembly, and/or increased design space relative to typical steering systems.

17 Claims, 6 Drawing Sheets

NOSE WHEEL STEERING SYSTEMS AND METHODS

FIELD

The present disclosure relates generally to landing gear systems and, more particularly, to nose landing gear systems with planetary steering.

BACKGROUND

Landing gear assemblies typically comprise a shock strut assembly coupled to a wheel axle having one or more wheels. Steering systems may include push-pull tubes connected to pedal horns on a lower strut cylinder. A pilot may provide a steering command signal, which commands a steering system, resulting in axle rotation.

SUMMARY

A steering system is disclosed herein. The steering system may comprise: a collar including a radially inner surface extending from a first end to a second end, a centerline of the radially inner surface defining a collar axis; an outer cylinder operably coupled to the collar; and a gear assembly comprising: a planet carrier including an annular portion and a flange portion, the planet carrier configured to rotate about the collar axis; an internal ring gear fixedly coupled to the outer cylinder; a sun gear coupled to an outer surface of the collar, the sun gear disposed radially inward of the internal ring gear; and a planet gear coupled to the planet carrier, the planet gear disposed between the sun gear and the internal ring gear.

In various embodiments, the planet gear defines a planet gear axis, wherein the planet gear is configured to rotate about the planet gear axis as it travels circumferentially around the collar axis. The steering system may further comprise a fastener coupling the planet gear to the planet carrier, wherein the planet gear is configured to rotate about the fastener. The planet gear may include a first plurality of teeth, wherein the sun gear includes a second plurality of teeth, and wherein a ratio of the second plurality of teeth to the first plurality of teeth provide a mechanical advantage. The steering system may further comprise a plurality of the planet gear, wherein the plurality of the planet gear are disposed circumferentially about the annular portion of the planet carrier. The flange portion may extend radially outward from the annular portion. The flange portion may include a plurality of teeth disposed on a radially outer surface, each tooth in the plurality of teeth including helical gear.

A nose landing gear steering system is disclosed herein. The nose landing gear system may comprise: a rack assembly including a rack disposed therein; a collar including a radially inner surface extending from a first end to a second end, a centerline of the radially inner surface defining a collar axis, the rack assembly being substantially parallel to the collar axis; an outer cylinder operably coupled to the collar; and a gear assembly comprising: a planet carrier including an annular portion and a flange portion, the flange portion operatively coupled to the rack; an internal ring gear fixedly coupled to the outer cylinder; a sun gear coupled to an outer surface of the collar, the sun gear disposed radially inward of the internal ring gear; and a planet gear coupled to the planet carrier, the planet gear disposed between the sun gear and the internal ring gear.

In various embodiments, the planet gear may define a planet gear axis, wherein the planet gear is configured to rotate about the planet gear axis as it travels circumferentially around the collar axis. The planet carrier may be configured to rotate about the collar axis in response to the rack travelling linearly along a rack axis. The planet gear may include a first plurality of teeth, wherein the sun gear includes a second plurality of teeth, and wherein a ratio of the second plurality of teeth to the first plurality of teeth provide a mechanical advantage. The nose landing gear system may further comprise a plurality of the planet gear, wherein the plurality of the planet gear are disposed circumferentially about the annular portion of the planet carrier. The flange portion may extend radially outward from the annular portion, and wherein the flange portion is configured to disengage the rack. The flange portion may include a plurality of teeth disposed on a radially outer surface, each tooth in the plurality of teeth including helical gear.

A nose landing gear steering system is disclosed herein. The nose landing gear system may comprise: a rack assembly including an electromechanical actuator or a hydraulic actuator; a collar including a radially inner surface extending from a first end to a second end, a centerline of the radially inner surface defining a collar axis; an outer cylinder operably coupled to the collar; and a gear assembly comprising: a planet carrier including an annular portion and a flange portion, the flange portion operatively coupled to the rack assembly; an internal ring gear fixedly coupled to the outer cylinder; a sun gear coupled to an outer surface of the collar, the sun gear disposed radially inward of the internal ring gear; and a planet gear coupled to the planet carrier, the planet gear disposed between the sun gear and the internal ring gear.

In various embodiments, the planet carrier defines a horizontal plane, and wherein the rack assembly is substantially parallel to the horizontal plane. The rack assembly may comprise a rack, wherein the rack includes a rack gear, and wherein a radially outer surface of the flange portion of the planet carrier includes a pinion gear. The rack assembly may be substantially parallel to the collar axis. The planet gear may include a first plurality of teeth, wherein the sun gear includes a second plurality of teeth, and wherein a ratio of the second plurality of teeth to the first plurality of teeth provide a mechanical advantage. The nose landing gear system may further comprise a plurality of the planet gear, wherein the plurality of the planet gear are disposed circumferentially about the annular portion of the planet carrier.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

A steering system is disclosed herein. The steering system comprises an outer cylinder, a ring gear, a sun gear, a planetary gear, a planet carrier, and a rack assembly. The rack assembly may be aligned vertically and/or horizontally. The rack assembly may be operatively coupled to the planet carrier. The planet carrier may be coupled to a plurality of the planetary gear. The ring gear may be coupled to the outer cylinder. When the planet carrier is rotated by a steering input device (e.g., a rack assembly), there may be an angular multiplication of the input resulting a mechanical advantage greater than a 1:1 ratio. In doing so, the steering input device may have shorter travel and/or allow for a smaller steering input device. In various embodiments, the rack assembly may include a steering range and a castor range. The rack in the rack assembly may disengage from interfacing teeth from the planet carrier when the rack assembly is in the castor range.

Figure 1:
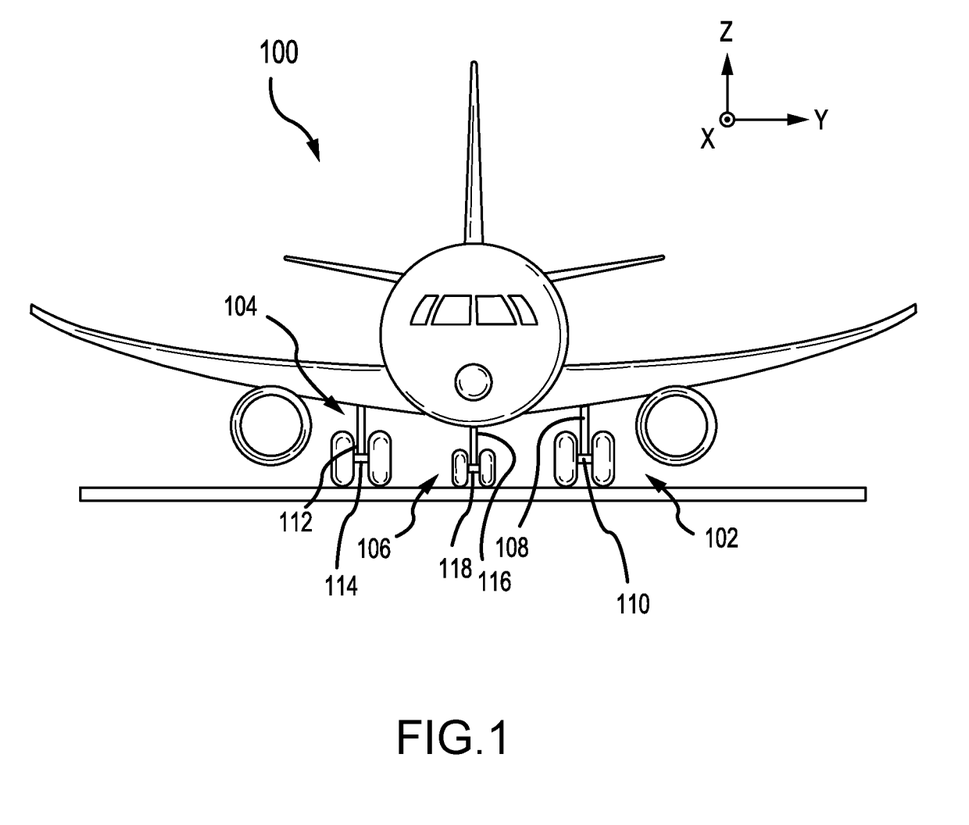
FIG. 1 illustrates an aircraft in accordance with various embodiments.

Referring now to FIG. 1, an aircraft 100 is illustrated. In accordance with various embodiments, the aircraft 100 may include one or more landing gear assemblies, such as, for example, a left landing gear assembly 102 (or port-side landing gear assembly), a right landing gear assembly 104 (or starboard-side landing gear assembly) and a nose landing gear system 106. Each of the left landing gear assembly 102, the right landing gear assembly 104 and the nose landing gear system 106 may support the aircraft 100 when not flying, allowing the aircraft 100 to taxi, takeoff and land, safely and without damage to the aircraft. In various embodiments, the left landing gear assembly 102 may include a left shock strut assembly 108 and a left wheel assembly 110, the right landing gear assembly 104 may include a right shock strut assembly 112 and a right wheel assembly 114 and the nose landing gear system 106 may include a nose shock strut assembly 116 and a nose wheel assembly 118.

Figure 2:
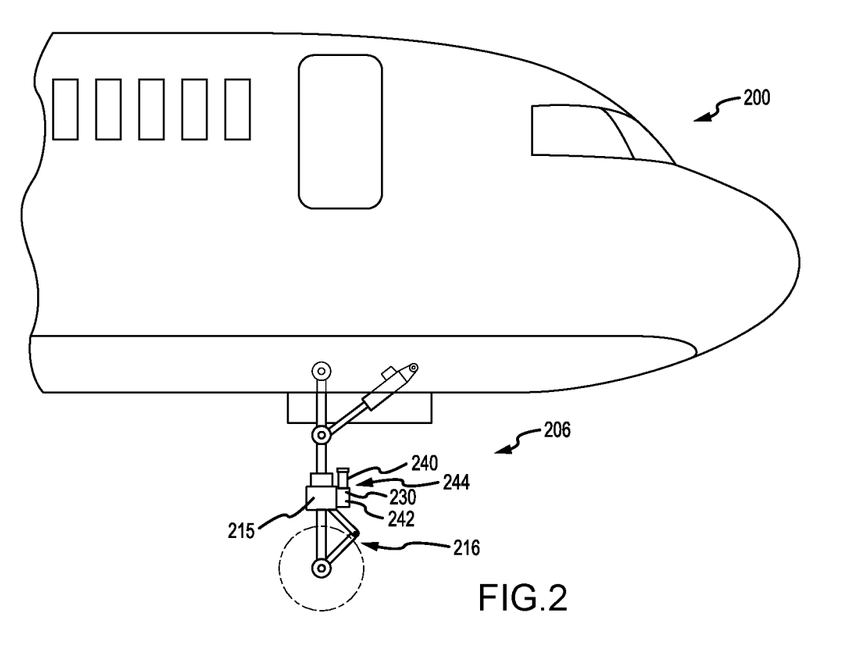
FIG. 2 illustrates an aircraft having a nose landing gear system, in accordance with various embodiments.

With reference to FIG. 2, an aircraft 200 having a nose landing gear system 206 is illustrated, in accordance with various embodiments. The nose landing gear system 206 includes a steering actuator 230. The steering actuator 230 is connected to a steering collar 215 that is itself connected to a nose shock strut assembly 216 and configured to steer the nose landing gear system 206. In various embodiments, the steering actuator 230 comprises a steering power source 240 (e.g., hydraulic pump or an electric motor). The steering actuator 230 may further comprise a rack assembly 242 configured to transmit power provided by the steering device 240 to the steering collar 215 in order to steer the aircraft 200. In various embodiments, the combination of the steering device 240 and the rack assembly 242 comprise an electro-mechanical actuator assembly, a hydraulic actuator assembly, or the like connected to steering collar 215 and the nose shock strut assembly 216 and configured to steer the aircraft 200.

Figure 3:
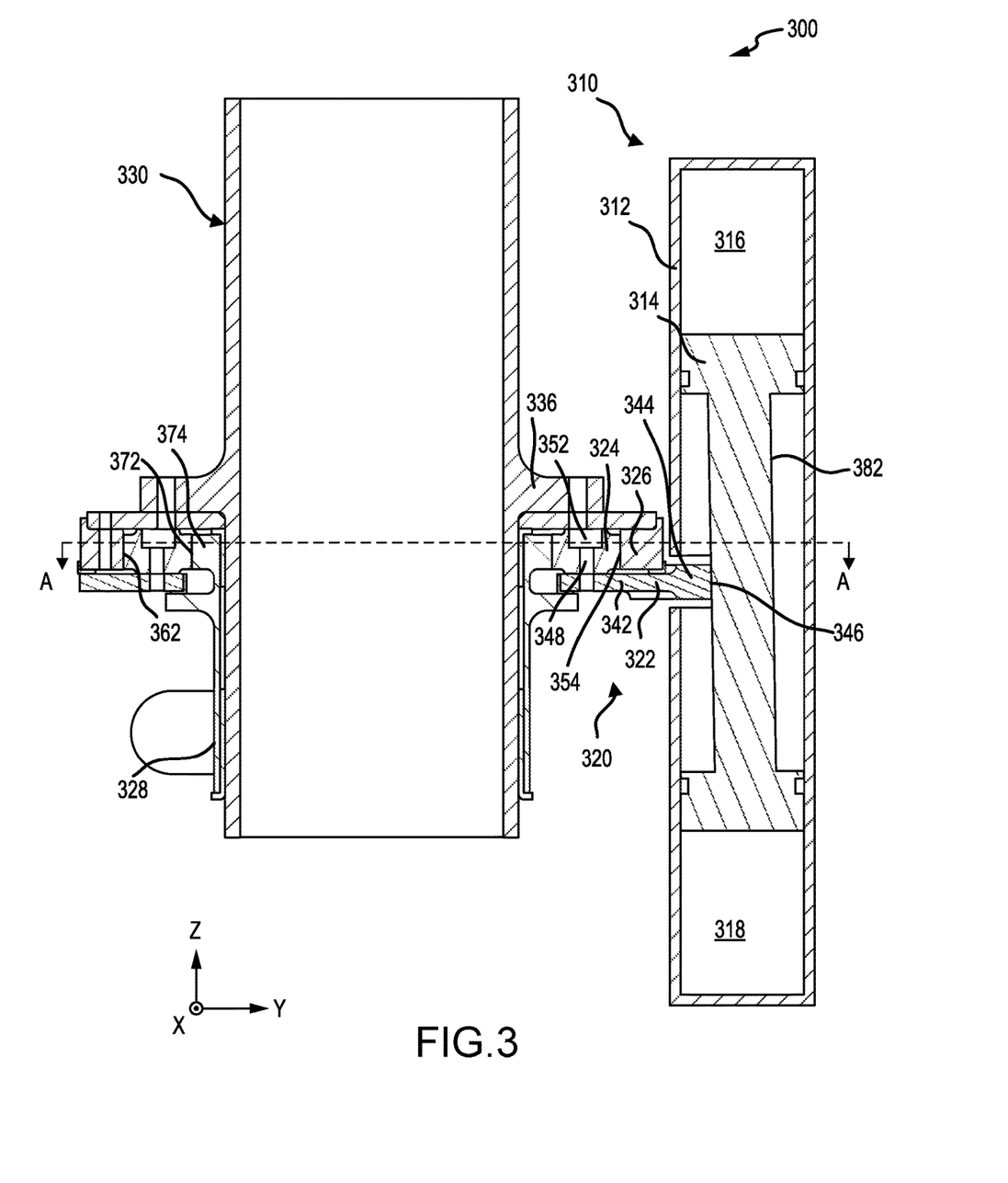
FIG. 3 illustrates a cross-sectional view of a steering system, in accordance with various embodiments.

Referring now to FIG. 3, a steering system 300, in accordance with various embodiments, is illustrated. The steering system 300 may be a nose landing gear steering system or the like. The steering system 300 comprises a rack assembly 310, a gear assembly 320, and an outer cylinder 330. In various embodiments, the rack assembly 310 may comprise a rack housing 312, a rack 314, a first hydraulic chamber 316 and a second hydraulic chamber 318. The rack 314 may be disposed between the first hydraulic chamber 316 and the second hydraulic chamber 318. First hydraulic chamber 316 and/or second hydraulic chamber 318 may be in fluid communication with a hydraulic pump via supply and return lines. The rack 314 may comprise a plurality of teeth 382.

In various embodiments, the gear assembly 320 comprises a planet carrier 322, a planet gear 324, an internal ring gear 326, a sun gear 374. The planet gear 324 may be coupled to the planet carrier 322. The planet carrier 322 may comprise an annular portion 342 and a flange portion 344. Flange portion of 344 may be configured to operatively couple to rack 314 of the rack assembly 310. For example, flange portion 344 may include a plurality of teeth 346 disposed on a radially outer surface of flange portion 344. The plurality of teeth 346 may comprise helical gears, worm gears, or the like. The plurality of teeth 346 of flange portion 344 may operatively engage the plurality of teeth 382 of rack 314. In various embodiments, planet gear 324 may comprise an aperture 348 disposed proximate a radially inner end of annular portion 342.

In various embodiments, the planet gear 324 may be coupled to the planet carrier 322. The planet gear 324 may comprise a counterbore 352. The counterbore 352 may define a planet gear axis. The counterbore 352 may be aligned with the aperture 348 of planet carrier 322. A fastener may couple the planet gear 324 to the planet carrier 322 by any method known in the art. The planet gear 324 may be configured to rotate about the planet gear axis and/or the fastener. The planet gear 324 may further comprise a plurality of teeth disposed at a radially outer surface of the planet gear 324. The planet gear 324 may be disposed between the internal ring gear 326 and a sun gear 374 of the collar 328.

In various embodiments, the internal ring gear 326 may be disposed radially outward from the sun gear 374 of the collar 328. The internal ring gear 326 is annular in shape. The internal ring gear 326 may comprise a plurality of teeth 362 disposed on a radially inner surface of internal ring gear 326. The plurality of teeth 362 of internal ring gear 326 may operatively engage the plurality of teeth 354 of the planet gear 324. The internal ring gear 326 may be fixedly coupled to outer cylinder 330 by any method known in the art, such as a fastener or the like.

In various embodiments, the collar 328 is coupled to a radially outer surface of the outer cylinder 330. The collar 328 may be operably coupled to the outer cylinder 330 by bushings, or the like. The sun gear 374 may comprise a plurality of teeth 372 disposed on a radially outer surface of a first flange of the collar 328. The plurality of teeth 372 of sun gear 374 may operatively engage the plurality of teeth 354 of the planet gear 324.

In various embodiments, rack 314 may travel linearly in the positive z-direction by pressurizing second hydraulic chamber 318. Similarly, rack 314 may travel linearly in the negative z-direction by pressurizing hydraulic chamber 318. In response to rack 314 traveling linearly in a vertical direction (i.e. positive or negative z-direction), the planet carrier 322 may be configured to rotate about a centerline of the outer cylinder 330 in the horizontal plane (i.e., the x-y plane). In response to the planet carrier rotating about the centerline of the outer cylinder 330, the planet gear 324 may travel radially about the centerline of the outer cylinder 330 and rotate the sun gear 374 accordingly. The number of teeth on the sun gear 374 compared to the number of teeth on the planet gear may be a design choice to provide a mechanical advantage to the gear assembly. The steering system 300 may be configured to provide increased rotary motion of the collar 328 and/or provide a direct connection to the rack assembly 310. The steering system 300 may further provide a magnification in torque. In this regard, the size of the rack assembly 310 may decrease, resulting in decreased weight, cost, and/or additional design space.

Additionally, the configuration as shown may provide improved design space by aligning the outer cylinder 330 and the rack assembly 310 substantially parallel to one another. "Substantially parallel," as described herein refers to parallel +/−15 degrees.

In various embodiments, the outer cylinder 330 may be annular in shape. The outer cylinder 330 may comprise a radially inner surface 332 extending from a first end 331 to a second end 333. A center line of the radially inner surface 332 may define a collar axis. The outer cylinder 330 may further comprise a radially outer surface 334 disposed radially outward from the radially inner surface. The outer cylinder 330 may further comprise a flange 336 extending radially outward from the radially outer surface 334. The flange 336 may be coupled to the internal ring gear 326 by any method known in the art, such as a fastener or the like.

Figure 4:
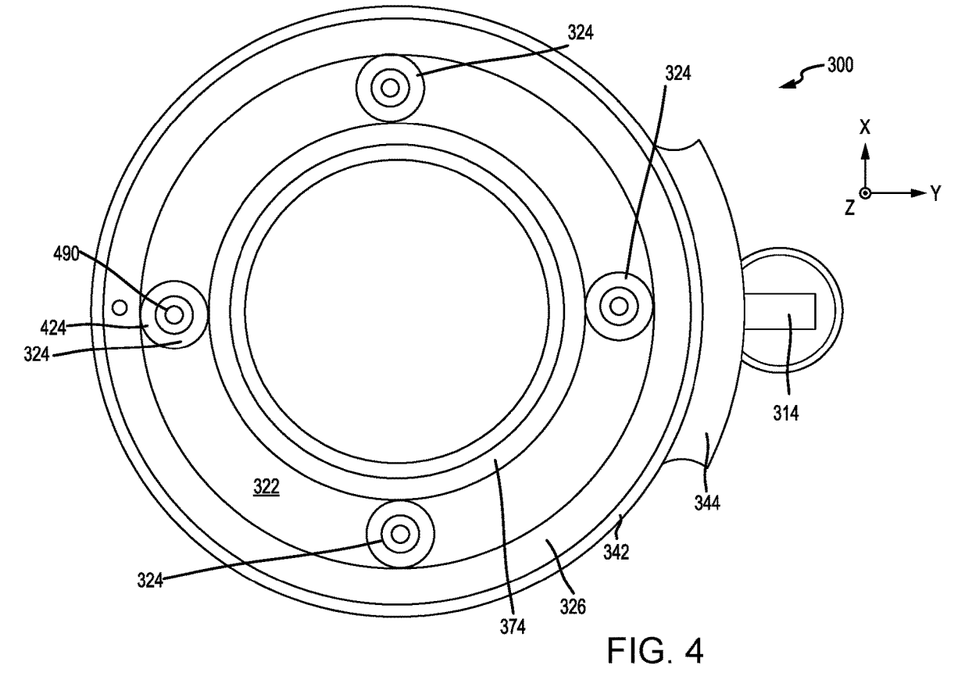
FIG. 4 illustrates a cross-sectional view of a steering system, in accordance with various embodiments.

Referring now to FIG. 4, a cross-section along section line A-A of FIG. 3, in accordance with various embodiments, is illustrated. In various embodiments, the steering system 300 further comprises a plurality of the planet gear 324. Each planet gear in the plurality of the planet gear 324 may be disposed circumferentially about planet carrier 322. In various embodiments, each planet gear in the plurality of the planet gear 324 may be disposed equidistant circumferentially from an adjacent planet gear in the plurality of the planet gear 324. In various embodiments, the steering system may comprise two or more planet gears. In various embodiments, each planet gear in the plurality of the planet gear 324 may be disposed varying circumferential distances from an adjacent planet gear in the plurality of the planet gear 324.

In various embodiments, the flange portion 344 of planet carrier 322 may correspond to a power steering angle for the steering system 300. For example, a power steeling angle of 60 degrees (+/−30 degrees) may include a flange portion 344 that extends radially outward from −30 degrees below an axis defined by a center point of planet carrier 322 extending radially outward to a center point of rack 314 (i.e., the y-axis) to a +30 degrees above the axis. In various embodiments, the flange portion 344 of planet carrier 322 may be configured to disengage the rack 314 and/or re-engage the rack 314. Upon disengaging, the steering system 300 may be in a free castor range corresponding to a complimentary angle of the power steering angle. For example, the free castor range of a steering system 300 including a 60 degree power steering angle may include a castor range of 300 degrees.

In various embodiments, each planet gear in the plurality of the planet gear 324 may be coupled to the annular portion 342 of the planet carrier 322 by a fastener. For example, a first planet gear 424 in the plurality of the planet gear 324 may be coupled to the annular portion 342 of the planet carrier 322 by fastener 490. The fastener 490 may be any fastener known in the art, such as a bolt, a shaft, or the like. The first planet gear 424 may be configured to rotate about the fastener 490 as it travels circumferentially about the internal ring gear 326 and the sun gear 374.

Figure 5:
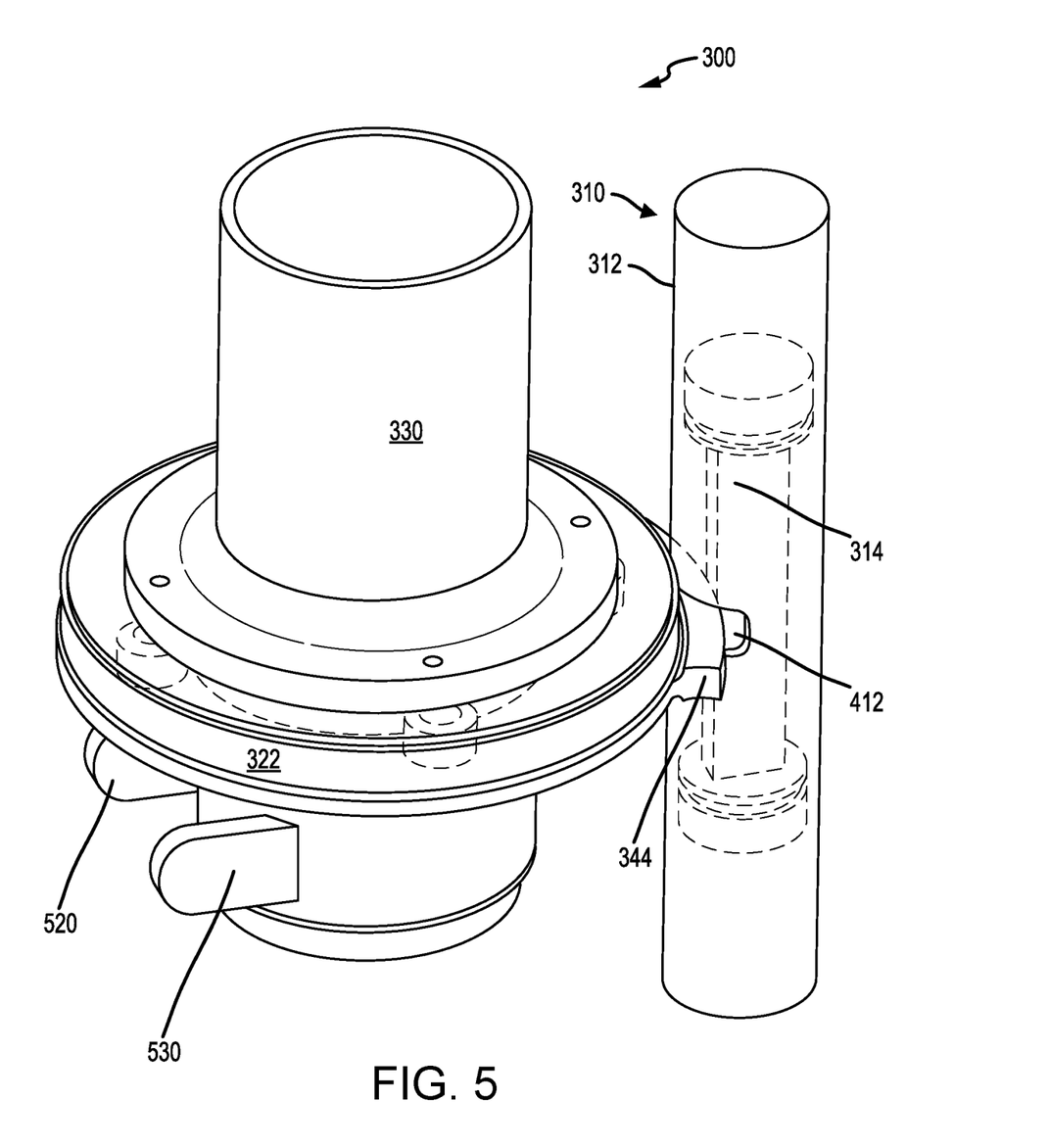
FIG. 5 illustrates a perspective view of a steering system, in accordance with various embodiments.

Referring now to FIG. 5, a perspective view of a steering system 300, in accordance with various embodiments, is illustrated. In various embodiments, the rack housing 312 may further comprising an aperture 412 disposed adjacent to the flange portion 344 of the planet carrier 322. The aperture 412 may be configured to receive flange portion 344 and allow flange portion 344 to operatively engage the rack 314 of the rack assembly 310.

The outer cylinder 330 may further comprise a first flange 520 and a second flange 530. The first flange 520 may extend radially outward from an outer surface of the outer cylinder 330. The first flange 520 and the second flange 530 may define a fork flange. The fork flange may be configured to couple to a nose landing gear. The fork flange may be disposed radially opposite the rack assembly 310.

Figure 6:
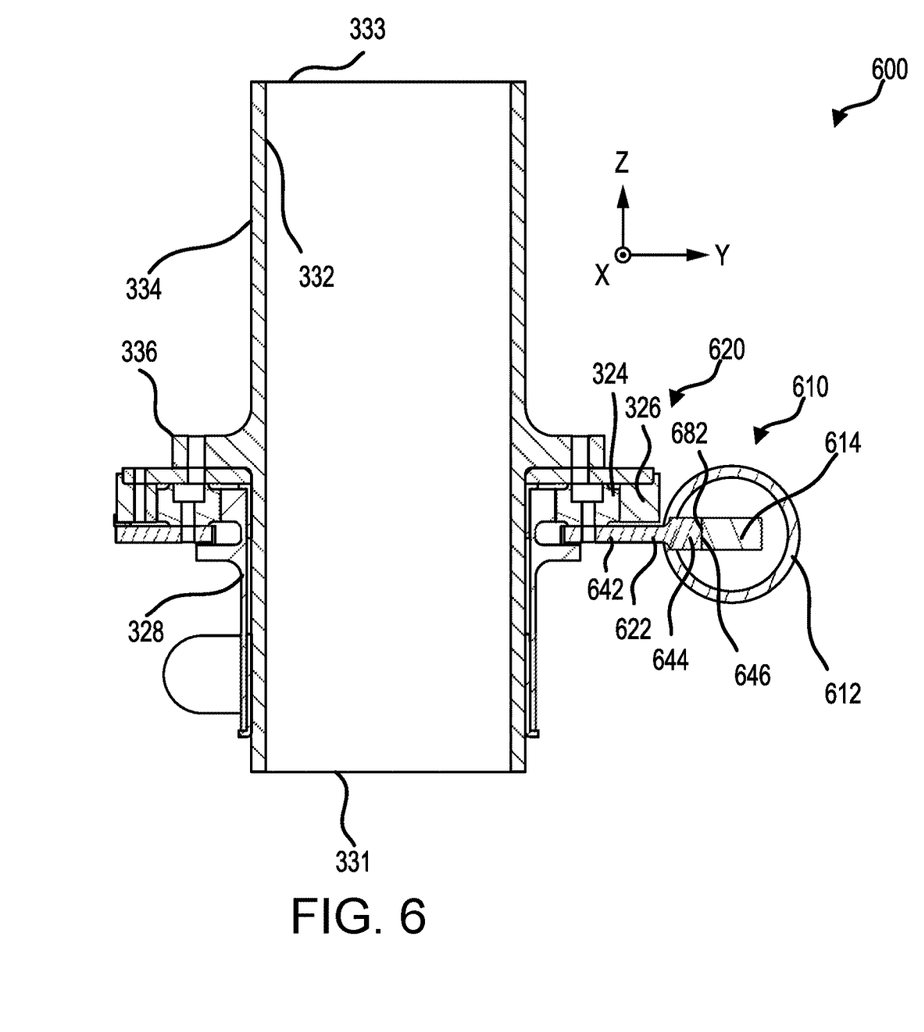
FIG. 6 illustrates a cross-sectional view of a steering system, in accordance with various embodiments.
Figure 7:
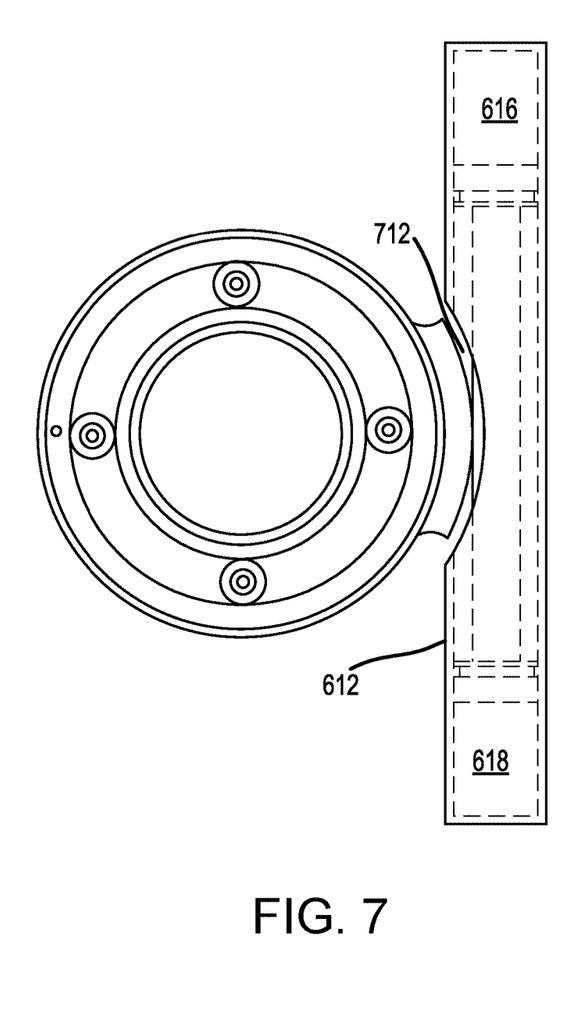
FIG. 7 illustrates a cross-sectional view of a steering system, in accordance with various embodiments.

Referring now to FIGS. 6 and 7, a steering system 600, in accordance with various embodiments, is illustrated. The steering system 600 may be a nose landing gear steering system or the like. The steering system 600 comprises a rack assembly 610, a gear assembly 620, and a outer cylinder 330. In various embodiments, the rack assembly 610 may comprise a rack housing 612, a rack 614, a first hydraulic chamber 616 and a second hydraulic chamber 618. The rack 614 may be disposed between the first hydraulic chamber 616 and the second hydraulic chamber 618. First hydraulic chamber 616 and/or second hydraulic chamber 618 may be in fluid communication with a hydraulic pump via supply and return lines. The rack 614 may comprise a plurality of teeth 682.

In various embodiments, the gear assembly 620 comprises a planet carrier 622, a planet gear 324, an internal ring gear 326, a sun gear 374. The planet gear 324 may be coupled to the planet carrier 622. The planet carrier 622 may comprise an annular portion 342 and a flange portion 644. Flange portion of 644 may be configured to operatively couple to rack 614 of the rack assembly 610. For example, flange portion 644 may include a plurality of teeth 646 disposed on a radially outer surface of flange portion 644. The plurality of teeth 646 may comprise pinion gears, or the like. The plurality of teeth 646 of flange portion 644 may operatively engage the plurality of teeth 682 of rack 614. The plurality of teeth 682 of the rack 614 may comprise rack gears or the like. The interface between the rack 614 and the planet carrier 622 may comprise a rack and pinion interface.

In various embodiments, rack 614 may travel linearly in the positive x-direction by pressurizing second hydraulic chamber 618. Similarly, rack 614 may travel linearly in the negative x-direction by pressurizing hydraulic chamber 618. In response to rack 614 traveling linearly in a horizontal direction (i.e. positive or negative x-direction), the planet carrier 622 may be configured to rotate about a centerline of the outer cylinder 330 in the horizontal plane (i.e., the x-y plane). In response to the planet carrier rotating about the centerline of the outer cylinder 330, the planet gear 324 may travel radially about the centerline of the outer cylinder 330 and rotate the sun gear 374 accordingly. The number of teeth on the sun gear 374 compared to the number of teeth on the planet gear may be a design choice to provide a mechanical advantage to the gear assembly.

In various embodiments, the rack housing 612 may further comprising an aperture 712 disposed adjacent to the flange portion 644 of the planet carrier 622. The aperture 712 may be configured to receive flange portion 644 and allow flange portion 644 to operatively engage the rack 614 of the rack assembly 610.

Although illustrated with respect to a hydraulic actuator for rack assemblies 310, 610, an electro-mechanical actuator is within the scope of this disclosure. For example, an electro-mechanical actuator may be configured to interface with planet carrier 322, 622 in a similar manner to rack 314, 614.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A steering system, comprising:
   a collar including a radially inner surface extending from a first end to a second end, a centerline of the radially inner surface defining a collar axis;
   an outer cylinder operably coupled to the collar; and
   a gear assembly comprising:
      a planet carrier including an annular portion and a flange portion, the planet carrier configured to rotate about the collar axis;
      an internal ring gear fixedly coupled to the outer cylinder;
      a sun gear coupled to an outer surface of the collar, the sun gear disposed radially inward of the internal ring gear; and
      a planet gear coupled to the planet carrier, the planet gear disposed between the sun gear and the internal ring gear, wherein:
         the flange portion extends radially outward from the annular portion, and
         the flange portion includes a plurality of teeth disposed on a radially outer surface, each tooth in the plurality of teeth including a helical gear.

2. The steering system of claim 1, wherein the planet gear defines a planet gear axis, wherein the planet gear is configured to rotate about the planet gear axis as it travels circumferentially around the collar axis.

3. The steering system of claim 2, further comprising a fastener coupling the planet gear to the planet carrier, wherein the planet gear is configured to rotate about the fastener.

4. The steering system of claim 1, wherein the planet gear includes a first plurality of teeth, wherein the sun gear includes a second plurality of teeth, and wherein a ratio of the second plurality of teeth to the first plurality of teeth are configured to provide a mechanical advantage.

5. The steering system of claim 1, further comprising a plurality of the planet gear, wherein the plurality of the planet gear are disposed circumferentially about the annular portion of the planet carrier.

6. A nose landing gear steering system, comprising:
a rack assembly including a rack disposed therein;
a collar including a radially inner surface extending from a first end to a second end, a centerline of the radially inner surface defining a collar axis, the rack assembly being substantially parallel to the collar axis;
an outer cylinder operably coupled to the collar; and
a gear assembly comprising:
a planet carrier including an annular portion and a flange portion, the flange portion operatively coupled to the rack;
an internal ring gear fixedly coupled to the outer cylinder;
a sun gear coupled to an outer surface of the collar, the sun gear disposed radially inward of the internal ring gear; and
a planet gear coupled to the planet carrier, the planet gear disposed between the sun gear and the internal ring gear.

7. The nose landing gear steering system of claim 6, wherein the planet gear defines a planet gear axis, wherein the planet gear is configured to rotate about the planet gear axis as it travels circumferentially around the collar axis.

8. The nose landing gear steering system of claim 6, wherein the planet carrier is configured to rotate about the collar axis in response to the rack travelling linearly along a rack axis.

9. The nose landing gear steering system of claim 6, wherein the planet gear includes a first plurality of teeth, wherein the sun gear includes a second plurality of teeth, and wherein a ratio of the second plurality of teeth to the first plurality of teeth provide a mechanical advantage.

10. The nose landing gear steering system of claim 6, further comprising a plurality of the planet gear, wherein the plurality of the planet gear are disposed circumferentially about the annular portion of the planet carrier.

11. The nose landing gear steering system of claim 6, wherein the flange portion extends radially outward from the annular portion, and wherein the flange portion is configured to disengage the rack.

12. The nose landing gear steering system of claim 11, wherein the flange portion includes a plurality of teeth disposed on a radially outer surface, each tooth in the plurality of teeth including helical gear.

13. A nose landing gear steering system, comprising:
a rack assembly including an electromechanical actuator or a hydraulic actuator;
a collar including a radially inner surface extending from a first end to a second end, a centerline of the radially inner surface defining a collar axis;
a gear assembly comprising:
a planet carrier including an annular portion and a flange portion, the flange portion operatively coupled to the rack assembly;
an internal ring gear fixedly coupled to the outer cylinder;
a sun gear coupled to an outer surface of the collar, the sun gear disposed radially inward of the internal ring gear; and
a planet gear coupled to the planet carrier, the planet gear disposed between the sun gear and the internal ring gear, wherein the rack assembly is substantially parallel to the collar axis.

14. The nose landing gear steering system of claim 13, wherein the planet carrier defines a horizontal plane, and wherein the rack assembly is substantially parallel to the horizontal plane.

15. The nose landing gear steering system of claim 14, wherein the rack assembly comprises a rack, wherein the rack includes a rack gear, and wherein a radially outer surface of the flange portion of the planet carrier includes a pinion gear.

16. The nose landing gear steering system of claim 13, wherein the planet gear includes a first plurality of teeth, wherein the sun gear includes a second plurality of teeth, and wherein a ratio of the second plurality of teeth to the first plurality of teeth is between 1.5:1 and 10:1.

17. The nose landing gear steering system of claim 13, further comprising a plurality of the planet gear, wherein the plurality of the planet gear are disposed circumferentially about the annular portion of the planet carrier.

* * * * *

UNITED STATES PATENT AND TRADEMARK OFFICE
CERTIFICATE OF CORRECTION

| | | |
|---|---|---|
| PATENT NO. | : 11,072,420 B1 | Page 1 of 1 |
| APPLICATION NO. | : 16/741489 | |
| DATED | : July 27, 2021 | |
| INVENTOR(S) | : James Acks et al. | |

It is certified that error appears in the above-identified patent and that said Letters Patent is hereby corrected as shown below:

On the Title Page

Column 1
Please insert -- Prior Publication Data US 2021/0214073 A1 Jul. 15, 2021 --

Signed and Sealed this
Second Day of November, 2021

Drew Hirshfeld
*Performing the Functions and Duties of the
Under Secretary of Commerce for Intellectual Property and
Director of the United States Patent and Trademark Office*